Sept. 30, 1924.  1,509,820
W. E. ADAMS ET AL
APPARATUS FOR SEPARATING THE GAS, OIL, AND WATER FROM OIL WELLS
Filed June 3, 1922
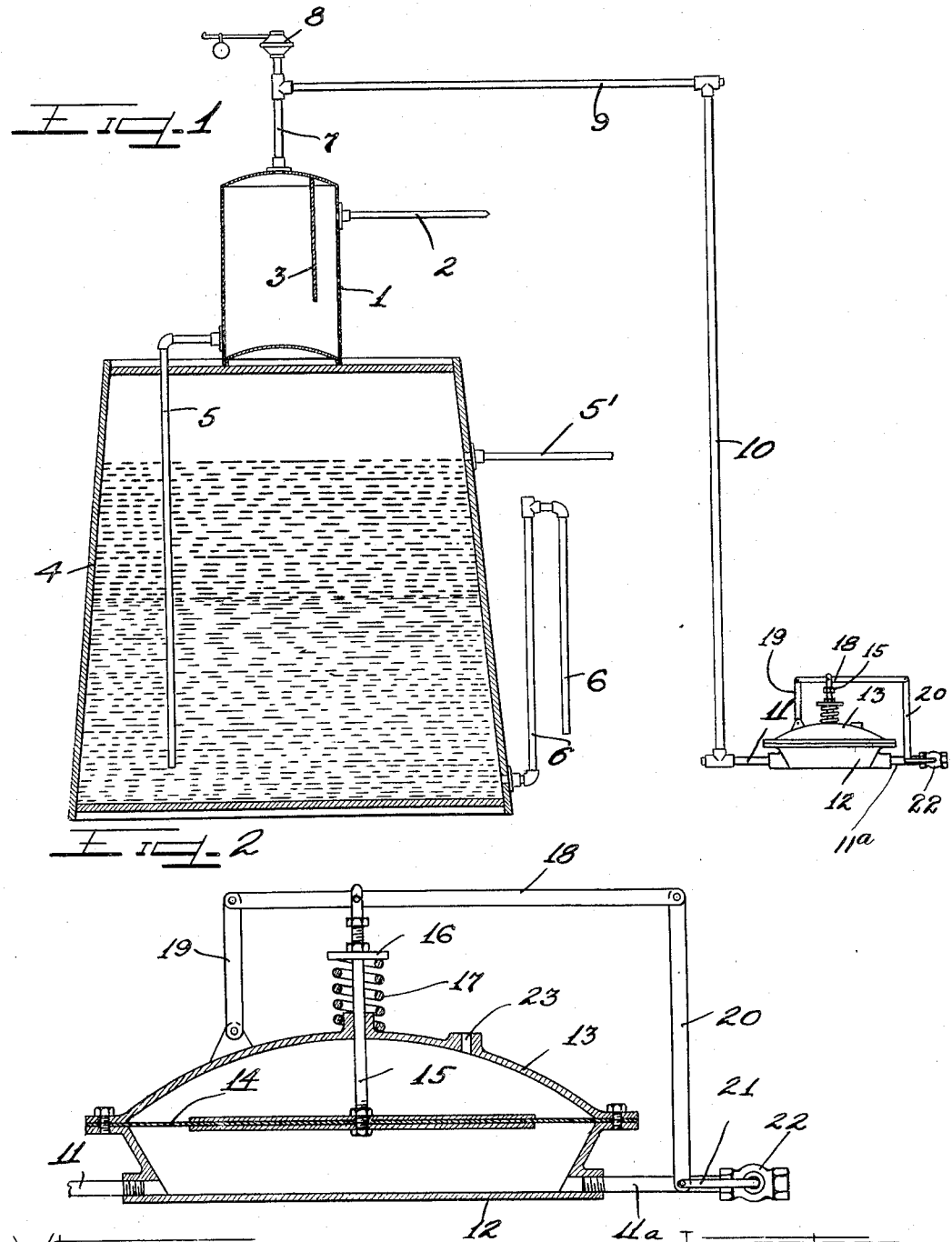

Patented Sept. 30, 1924.

1,509,820

UNITED STATES PATENT OFFICE.

WILLIAM E. ADAMS AND CHARLES B. HALL, OF TULSA, OKLAHOMA.

APPARATUS FOR SEPARATING THE GAS, OIL, AND WATER FROM OIL WELLS.

Application filed June 3, 1922. Serial No. 565,620.

*To all whom it may concern:*

Be it known that we, WILLIAM E. ADAMS and CHARLES B. HALL, citizens of the United States, and residents of the city of Tulsa, in the county of Tulsa and State of Oklahoma, have invented certain new and useful Improvements in an Apparatus for Separating the Gas, Oil, and Water from Oil Wells; and we do hereby declare that the following is a full, clear, and exact description of the same, reference being had to the accompanying drawings and to the numerals of reference marked thereon, which form a part of this specification.

This invention relates to an apparatus for separating the gas, oil and water from oil wells.

It is well known that more or less gas usually accompanies the flow of oil from an oil well, whether the same be an artesian well or one that is pumped by machinery. This gas, which ordinarily escapes or is allowed to go to waste, is rich in gasoline content and is a valuable product.

It is primarily an object of this invention to provide an apparatus and process in which the gaseous product of oil wells is separated from the liquid content and from which it is adapted to be conveyed for the manufacture of gasoline or for any other purpose and in which the oil is separated from the water.

This invention comprises the novel mechanism and combinations hereinafter described and more particularly pointed out and defined in the appended claims.

In the accompanying drawings, which illustrate a preferred embodiment of this invention, and in which similar reference numerals refer to similar features in the different views:

Figure 1 is a vertical sectional view of the apparatus with the piping shown in elevation.

Figure 2 is a section through the gas regulator with the operating mechanism shown in section, upon an enlarged scale.

As shown on the drawings:

In referring to the drawings, which illustrate one embodiment of this invention, the reference numeral 1 represents a separator into which the mixed gaseous and liquid product from the well may flow or be pumped through the pipe 2 which enters the separator near the top thereof. The separator 1 consists of a substantially closed vessel with a transverse shield or baffle plate 3 in front of the inlet pipe 2 to prevent the liquid product from spraying across the vessel. The shield 3 extends from the top of the vessel to a point below the center thereof whereby the upper part of the vessel is divided into two compartments, one into which the product from the oil well passes, and the other in which the gaseous product may collect and from which it may pass.

The separator 1 communicates with a liquid product tank 4 through a gravity discharge pipe 5 leading from a point near the bottom of the separator into the tank 4 to a point near the bottom thereof. The liquid product in the separator 1 will settle at the bottom thereof and flow by gravity into the tank 4, in which the water will settle at the bottom and the oil, which is of lesser density than the water, will rise to the top as shown in Figure 1, and when the height of oil reaches the pipe 5' it will flow therethrough to the oil tanks to which the pipe 5' may be connected. From the bottom of the tank 4, there extends a water overflow pipe 6 open at the top and communicating with a pipe 6' at a point just below the top for draining the water from the tank when it reaches a predetermined level.

In the top of the separator 1, there is a discharge pipe 7, through which the gas which has been separated from the liquid product may pass. This pipe 7 may connect with a safety or relief valve 8, and also with a line of pipes 9, 10 and 11, which may lead to a gas reservoir or pump or wherever it is desired to use the gas. A gas regulator is inserted in the discharge line, being shown in the section 11.

This regulator comprises a lower housing section 12 into which the pipe 11 extends and from which a discharge pipe 11ª extends and an upper curved housing section 13 which is bolted to the lower section with a diaphragm 14 secured therebetween. The diaphragm 14 is suitably connected to a vertical rod 15 which slidably extends through an aperture in the upper section, and to a suitable height thereabove. A washer or small disk 16 is secured upon the rod 15 in spaced relation to the top of the housing, and a coil spring 17 is confined between the top of the housing and said disk for counterbalancing the force exerted by a lever 18 pivoted intermediate its ends to the rod 15; one end of said lever being connected to a vertical link 19 pivoted to the top of the valve housing 13 while the other end is connected to a link 20 which in turn is pivotally connected to a valve rod or arm 21 for opening and closing a valve denoted as a whole by the reference numeral 22 in pipe 11ª. The upper section 13 of the housing is provided with an air port 23 for the admission of air to the top of the diaphragm 14 which will hence, normally, be under atmospheric pressure.

In the drawing the diaphragm is shown in balanced position with the valve 22 closed. Now when the gas pressure in the tank 1 and pipe line 9—10—11 rises above the atmosphere pressure, the diaphragm 14 will be forced upwardly raising the lever 18 thereby to open the valve 22 for the escape of gas, and when the gas pressure has been decreased by such escape to substantially atmospheric pressure again, the valve 22 will again be closed by the atmospheric pressure on the top of the diaphragm as is obvious. Similarly, when the gas pressure in tank 1 falls below atmospheric pressure the atmospheric pressure on the diaphragm 14 will force it downward below its normal position, thereby rocking lever 21 downward, and opening the valve 22 to vent the separator 1. It is therefore evident that the pressure in the separating cylinder 1 will neither rise above nor fall below the atmospheric pressure and no vacuum will be created in the tank 1 to cause the water to rise therein from the tank 4. In order to prevent the gas from the separating tank 1 from being forced into the tank 4, the pipe 5 may be made to extend sufficiently deep into the tank 4 so that a sufficient fluid head will exist above the lower end of pipe 5. It will of course be realized that it is only necessary that this fluid pressure head exceed the pressure necessary to actuate the diaphragm 14.

It will accordingly be apparent that this invention comprises an apparatus for receiving the mixed gaseous and liquid product from oil wells, in which the gaseous product is separated from the liquid product and collected for use, and in which the oil is separated from any water content that may be present.

We are aware that numerous details of construction may be varied through a wide range without departing from the principles of this invention, and we therefore do not purpose limiting the patent granted otherwise than necessitated by the prior art.

We claim as our invention:

1. In an apparatus of the class described, a separating vessel having an inlet adapted for receiving the product from oil wells, a gas discharge pipe connected to the top of said separating vessel, and an automatic pressure regulating valve in said gas discharge pipe for relieving either excess or sub-normal pressure therein.

2. In an apparatus of the class described, a separating vessel having an inlet adapted for receiving the product from oil wells, a liquid product tank, a pipe connecting the bottom of said separating vessel with the bottom of said liquid product tank, upper and lower discharges for the said liquid product tank, a gas discharge pipe connected to the top of said separating vessel, and an automatic pressure regulating valve in said gas discharge pipe for relieving either excess or sub-normal pressure therein.

In testimony whereof, we have hereunto subscribed our names in the presence of two subscribing witnesses:

WILLIAM E. ADAMS.
CHARLES B. HALL.

Witnesses:
JOHN N. DAY,
CHARLES E. ADAMS.